United States Patent
Satterfield et al.

(10) Patent No.: US 8,015,423 B1
(45) Date of Patent: Sep. 6, 2011

(54) TEMPORALLY NORMALIZED PROCESSOR UTILIZATION

(75) Inventors: Wade J. Satterfield, Fort Collins, CO (US); John R Brandy, Fort Collins, CO (US); Michael R Stabnow, Fort Collins, CO (US); Phil Prasek, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 12/261,422

(22) Filed: Oct. 30, 2008

(51) Int. Cl.
*G06F 1/32* (2006.01)
*G06F 1/26* (2006.01)

(52) U.S. Cl. .................... 713/322; 713/320; 710/104

(58) Field of Classification Search .................... 713/375
See application file for complete search history.

(56) References Cited

U.S. PATENT DOCUMENTS

| | | | | |
|---|---|---|---|---|
| 6,574,739 | B1 * | 6/2003 | Kung et al. | 713/322 |
| 6,829,713 | B2 * | 12/2004 | Cooper et al. | 713/320 |
| 6,996,728 | B2 * | 2/2006 | Singh | 713/300 |
| 7,028,211 | B2 * | 4/2006 | Mantani | 713/600 |
| 7,536,567 | B2 * | 5/2009 | Bonola et al. | 713/300 |
| 7,596,709 | B2 * | 9/2009 | Cooper et al. | 713/323 |
| 7,761,874 | B2 * | 7/2010 | Bodas | 718/100 |
| 2003/0204759 | A1 * | 10/2003 | Singh | 713/320 |
| 2006/0129852 | A1 * | 6/2006 | Bonola et al. | 713/300 |
| 2009/0007128 | A1 * | 1/2009 | Borghetti et al. | 718/104 |
| 2009/0271046 | A1 * | 10/2009 | Lewis et al. | 700/291 |
| 2011/0029651 | A1 * | 2/2011 | Snyder et al. | 709/223 |

FOREIGN PATENT DOCUMENTS

WO   WO 2008110423 A1 * 9/2008

* cited by examiner

*Primary Examiner* — Ryan M Stiglic

(57) ABSTRACT

A temporally normalized processor utilization trace is generated.

14 Claims, 4 Drawing Sheets

TEMPORALLY NORMALIZED PROCESSOR UTILIZATION

BACKGROUND

Computer processors execute instructions using one or more clock cycles. However, when a processor is not fully utilized, it is idle during some of these clock cycles. The percentage of time in which the processor is not idle is often referred to as that processor's "utilization".

In many systems, periodicities and trends can be identified that allow future utilization to be predicted. For this reason, utilization data can be very useful for regulation and planning purposes. For example, some processors have low power modes that can be entered to save energy during prolonged low utilization. In data centers with multiple servers, workloads can be moved from a server with high processor utilization to a server with low processor utilization to lower the risk of bottlenecks or faults. Alternatively, workloads can be moved from low utilization servers to moderate utilization servers so that the former can be shut down to save energy. If most servers in a data enter are highly utilized, utilization data can be used to suggest what resources need to be added to maintain a smoothly running system.

BRIEF DESCRIPTION OF THE DRAWINGS

The figures depict implementations/embodiments of the invention and not the invention itself.

DETAILED DESCRIPTION

Figure 1:
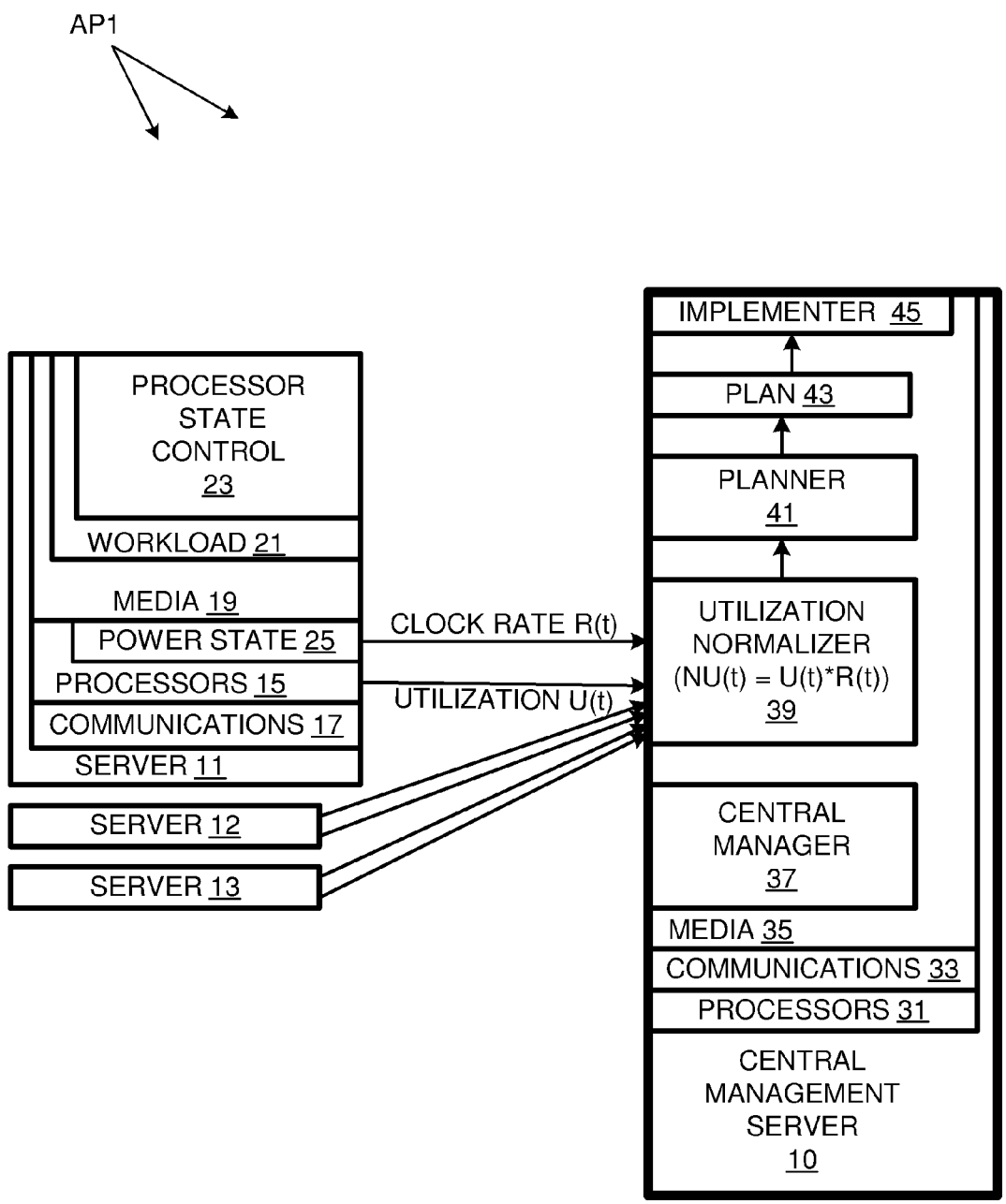
FIG. 1 is a schematic diagram of a data center in accordance with an embodiment of the present invention.

In the course of the present invention, it was realized that planning accuracy can be enhanced by temporally normalizing utilization data for processors for which the clock rate changes. For example, if a processor runs at 40% utilization at 2 GHz for one five-second period and at 40% utilization at 1 GHz for another five-second period, the two 40% utilization figures represent very different levels of demand. In fact, 20% utilization at 2 GHz corresponds approximately to the same demand as 40% at 1 GHz. If this fact is ignored, periodicities and trends in utilization will be misrepresented and planning predictions will not be as accurate as they could be. Accordingly, the present invention provides for converting un-normalized utilization traces (utilization v time profiles) to normalized utilization traces.

The normalization referred to herein is temporal intra-processor normalization, i.e., normalization of trace data for one processor, core, or set of processors, across time intervals. This is distinct from inter-processor normalization that compensates for differences in utilization data due to differences in word lengths, clock rates, number of cores, parallelism, pipelining, etc.

A data center AP1 includes a central management server 10 and managed servers 11-13. For the purposes herein, servers 12 and 13 are comparable to server 11. Server 11 includes processors 15, communications devices 17, and computer-readable storage media 19, a type of manufacture encoded with programs of computer-executable instructions. The programs are represented herein by workload 21, which can include an application and an operating system, but also includes a processor state controller 23 for controlling a processor state 25 and thus a clock rate for processors 15.

Central-management server 10 includes processors 31, communications devices 33, and computer-readable storage media 35. Computer-readable storage media 35 is a manufacture encoded with programs of computer-executable instructions. These programs include a central manager 37, a utilization normalizer 39, a planner 41 for producing a plan 43, and an implementer 45. Implementer 45 is used to implement plans generated in the context of dynamic workload management and instant capacity; however, plans developed in the context of purchase recommendations are not implemented by implementer 45.

Figure 2:
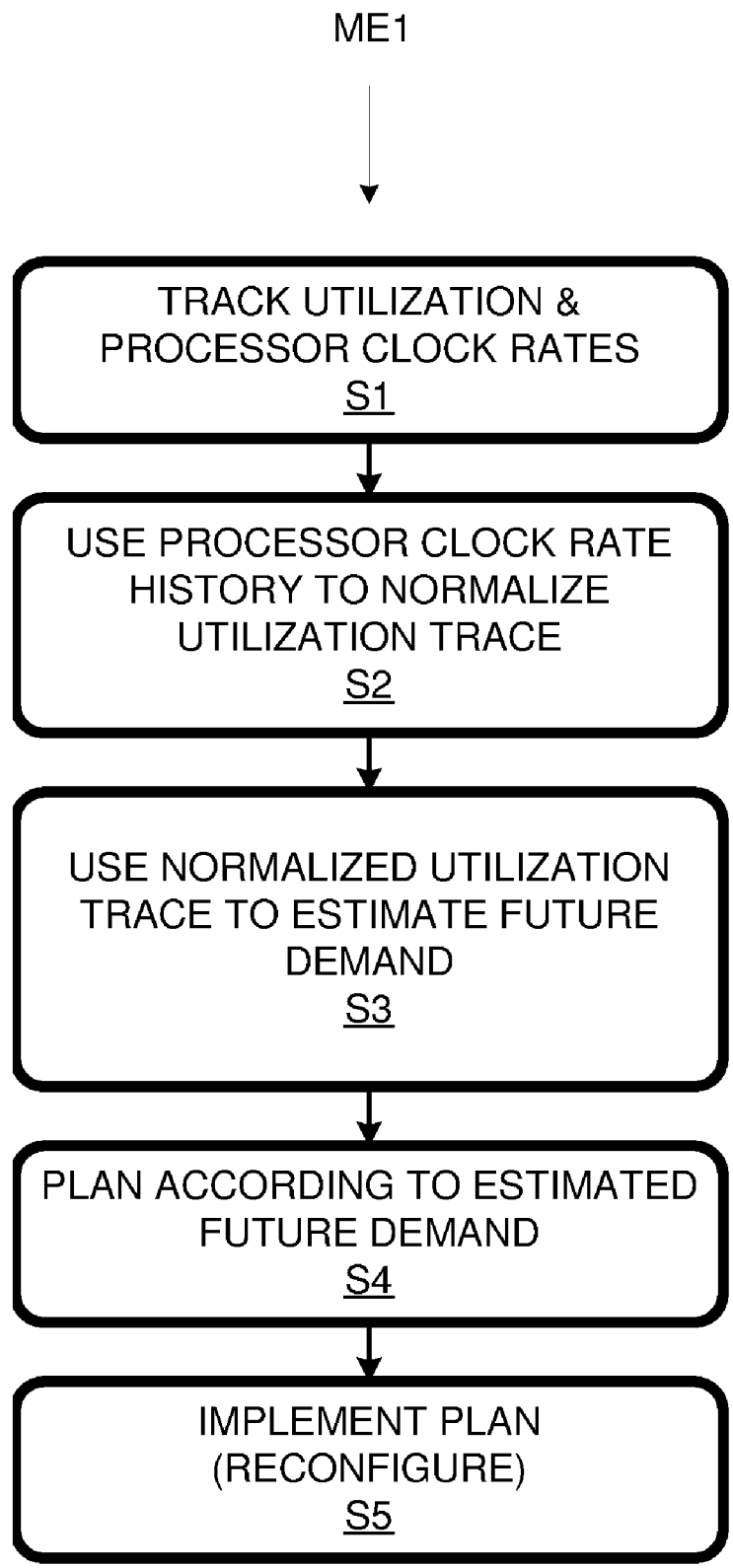
FIG. 2 is a flow chart in accordance with an embodiment of the invention.

Data center AP1 provides for a method ME1 as flow charted in FIG. 2. At method segment S1, processor utilization and processor clock rates are tracked. In the embodiment of FIG. 1, workload 21 can periodically read utilization values provided by processors 15. Processor states are set by processor state control 23, which records its commands to processors 15. Thus, processor state control 23 and workload 21 generally provide a utilization trace and clock rate data to utilization normalizer 31 of central management server 10.

Figure 3:
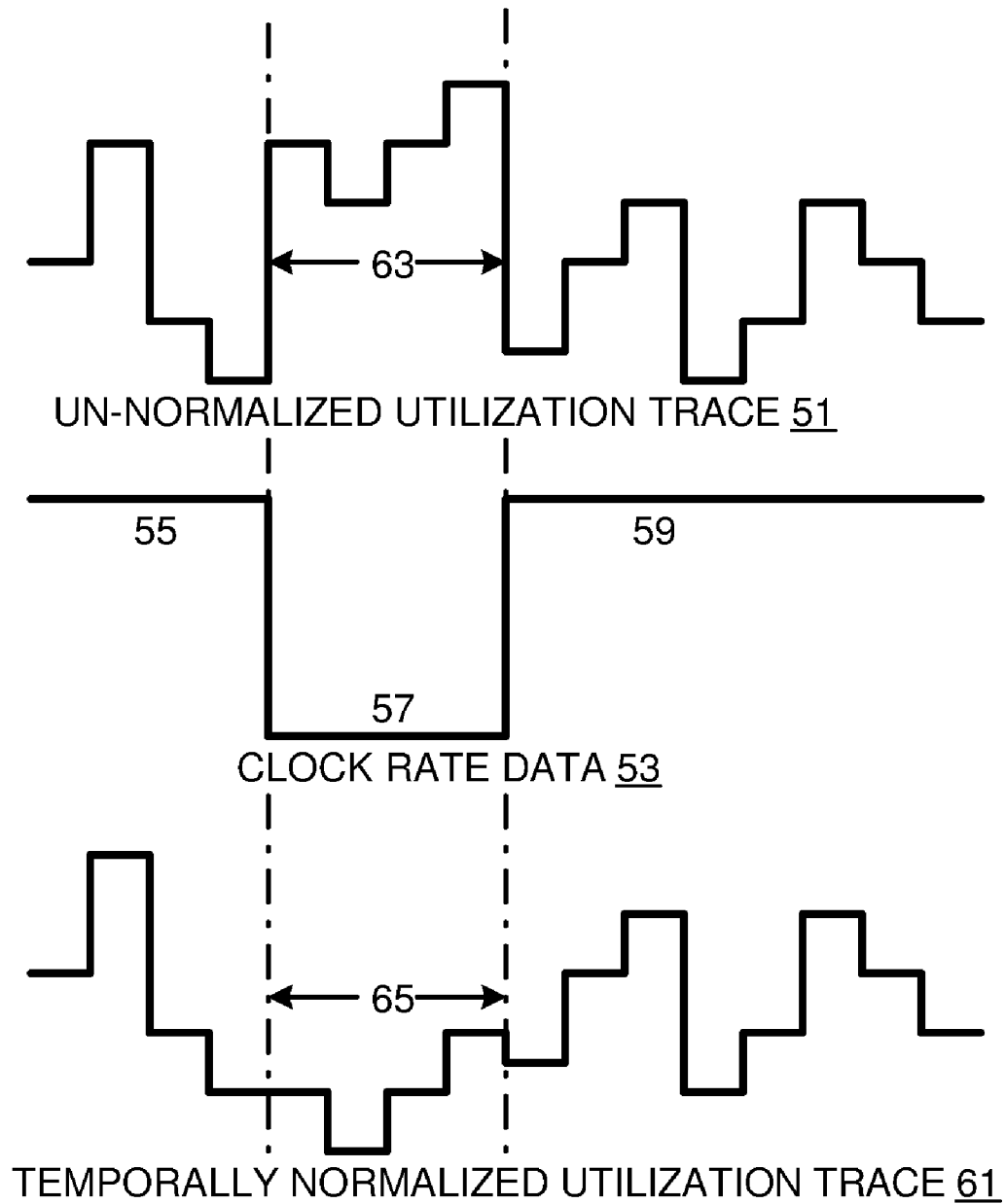
FIG. 3 is a graph showing relationships among an un-normalized processor utilization trace, a clock-rate data trace, and a normalized processor utilization trace.

At step S2, utilization normalizer 39 uses the clock rate data to temporally normalize the utilization trace. For example, an un-normalized trace 51 of processor utilization by time is shown in FIG. 3. Clock rate data 53 shows an initial high performance interval 55, followed by a half-speed interval 57, followed by another high performance interval 59.

Unnormalized trace 51 can be broken into constant clock-rate segments, e.g., corresponding to clock-rate intervals 55, 57, and 59, respectively. The segments can be multiplied by coefficients corresponding to their respective clock rates. The resulting utilization segments can then be concatenated to yield normalized trace 61.

Using clock rate data 53 to normalize trace 51 yields temporally normalized utilization trace 61. Note that interval 63 of un-normalized trace 51 appears to be a period of high demand. However, interval 63 corresponds to half-speed interval 57 for clock data 53. Looking at concurrent interval 65 of normalized utilization trace 61, it can be seen that there was relative low demand rather than high demand during interval 63. Accordingly, normalization provides a more accurate picture of demand for use in planning.

At step S3, shown in FIG. 2, planner 41 estimates future demand using normalized utilization trace 61. That is, patterns and trends in the normalized utilization trace can be extrapolated to predict future demand. At step S4, planner 41 formulates plan 43 based on estimated future demand. At step S5, implementer 45 implements plan 43. This can involve reconfiguring server 11, for example, by migrating workloads among servers or shifting computing resources among workloads. Alternatively, a plan may be implemented manually—e.g., a plan involving purchasing additional server stations would involve some manual aspects.

Figure 4:
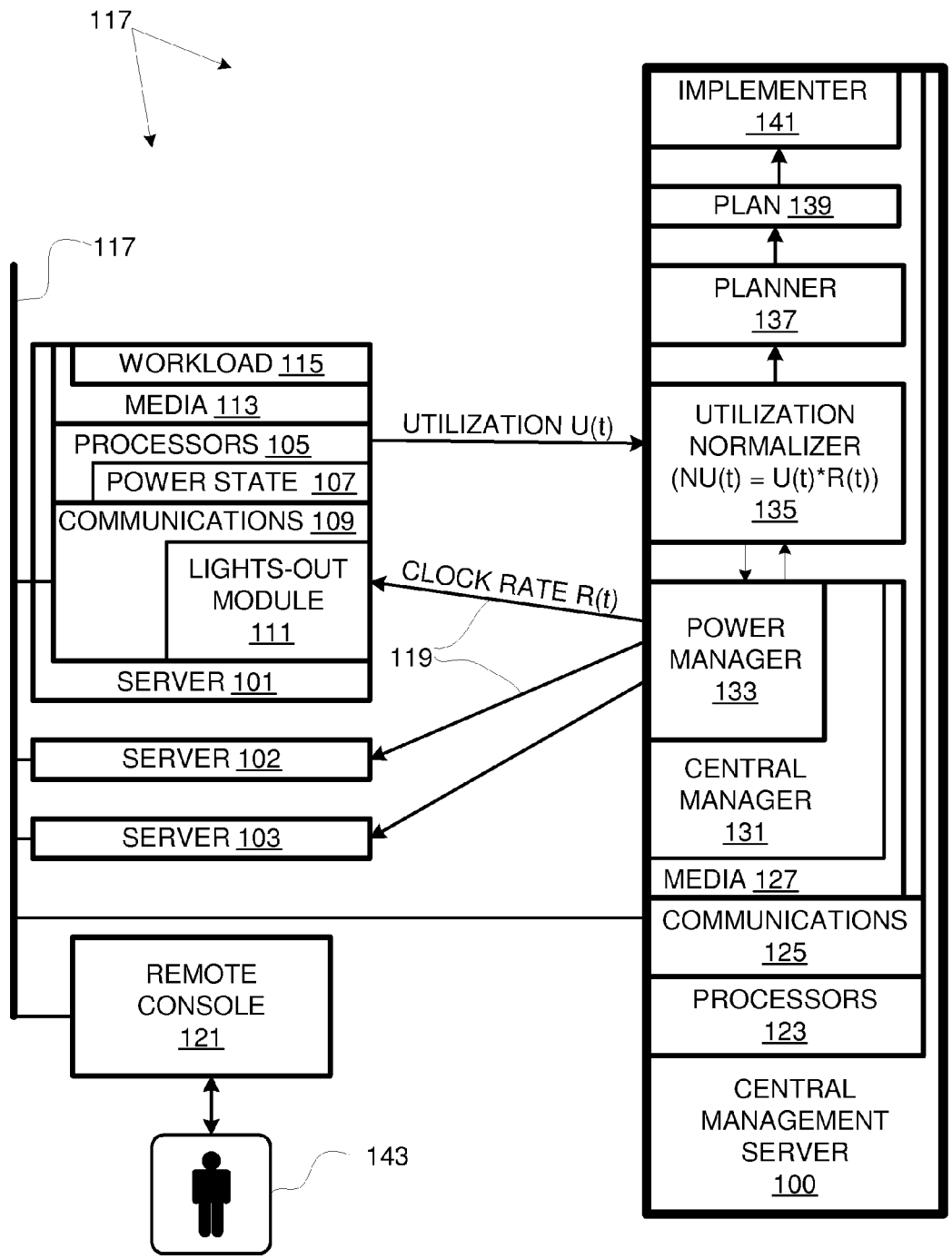
FIG. 4 is a schematic diagram of a second data center in accordance with an embodiment of the invention.

Method ME1 can also be practiced in the context of data center AP2, shown in FIG. 4. Data center AP2 includes a central-management server 100 and managed servers 101, 102, and 103. Servers 102 and 103 are similar to server 101 for purposes herein. Server 101 includes processors 105 that can have power states 107, communications devices 109 including a lights-out module 111, computer-readable media 113 on which programs of a workload 115 can be encoded.

Data center AP2 also includes networks 117 and 119. Network 117 is an "in-band" network through which workloads running on servers 101, 102, 103, can communicate with each other, with software running on central management server 100, and with a remote console 121. Network 119 is an "out-of-band" network through which central-management server 100 performs some management functions with respect to servers 101-103.

Central-management server 100 includes processors 123, communications devices 125, and computer-readable storage media 127. These programs include a central manager 131 including a power manager 133, a utilization normalizer 135, a planner 137 for generating a plan 139, and a plan implementer 141.

In data center AP2, lights-out module 111 controls power state 107. Additional programming of the lights-out module 111 can be passed from the power manager 133 via the out-of-band network 119. The lights-out module 111 can monitor the power state 107 of the processors 105 and return this to the power manager 133 on request. In particular, power manager 133 "knows" the clock rate of processors 105. So, while it obtains utilization data from server 101, utilization normalizer 135 obtains clock rate data locally (i.e., from with central management server 100) from power manager 133. Lights-out module 111 can compute an average clock rate for a time interval in which the clock rate changes; that average clock rate becomes the constant clock rate used in normalization for that interval.

As mentioned above, method ME1 can be practiced in the context of data center AP2. In this case, a human administrator 143 can interact with remote console 121 to control planner 137, e.g., to try out a number of "what if" server configuration scenarios in the course of generating plan 139 at least in part as a function of normalized power utilization trace 61. Remote console 121 can communicate with planner 137 over the Internet. Thus, remote console 121 can be in one country while data center AP2 is in another.

Herein, "media" refers to computer-readable storage media on which data and/or programs of computer-executable instructions are encoded. All media herein qualifies as a manufacture; "media" encompasses media from which a program is executed as well as distribution media. These and other variations upon and modifications to the illustrated embodiment are provided by the present invention, the scope of which is defined by the following claims.

What is claimed is:

1. A method comprising:
operating a computer including a processor set of one or more processors;
tracking utilization by said processor set to provide an un-normalized utilization trace for said set;
tracking one or more clock-rates for said processor set to provide respective clock-rate data; and
calculating a temporally normalized processor utilization trace as a function of said un-normalized trace and said clock-rate data, said calculating including breaking said utilization trace into constant clock-rate segments and multiplying said segments with coefficients determined by the clock rates for respective segments, said calculating further including concatenating said segments to provide said normalized processor utilization trace.

2. A method as recited in claim 1 further comprising providing an estimated future normalized utilization as a function of said normalized processor utilization trace.

3. A method as recited in claim 2 further comprising generating a plan for a new computer configuration as a function of said future normalized utilization.

4. A computer system comprising:
a computer having a processor set of one or more processors, said computer having a utilization monitor for providing an un-normalized utilization trace for said processors;
a processor controller for setting a clock rate for said processor set, said processor controller providing clock-rate data indicating clock rate as a function of time;
a calculator for calculating a temporally normalized utilization trace for said processor set from said utilization trace and said clock rate data, said calculator being configured to break said utilization trace into constant clock-rate segments and multiplying said segments with coefficients determined by the clock rates for respective segments, said calculator being configured to concatenate said segments to provide said normalized processor utilization trace.

5. A computer system comprising:
a computer having a processor set of one or more processors, said computer having a utilization monitor for providing an un-normalized utilization trace for said processors;
a processor controller for setting a clock rate for said processor set, said processor controller providing clock-rate data indicating clock rate as a function of time;
a calculator for calculating a temporally normalized utilization trace for said processor set from said utilization trace and said clock rate data.

6. A computer system as recited in claim 5 further comprising a central-management server, said processor controller being a power manager running on said server.

7. A computer system as recited in claim 6 wherein said calculator runs on said server.

8. A computer system as recited in claim 5 further comprising a planner for planning a computer configuration as a function of said normalized utilization trace.

9. A computer system as recited in claim 8 further comprising an implementer for implementing said plan.

10. A manufacture comprising non-transitory computer-readable storage media encoded with programs of computer-executable instructions, said programs including a calculator for calculating a temporally normalized processor utilization trace as a function of an un-normalized processor utilization trace and of processor clock rate versus time data, said calculating including breaking said utilization trace into constant clock-rate segments and multiplying said segments with coefficients determined by the clock rates for respective segments, said calculating further including concatenating said segments to provide said normalized processor utilization trace.

11. A manufacture as recited in claim 10 wherein said programs further comprise a planner for generating a plan involving a reconfiguration of a computer system as a function of said un-normalized processor utilization trace.

12. A manufacture as recited in claim 11 further comprising an implementer for implementing said plan.

13. A manufacture as recited in claim 10 further comprising a power manager for controlling said clock rate.

14. A manufacture as recited in claim 13 wherein said power manager communicates said clock rates to said calculator.

* * * * *